(12) United States Patent
Wada

(10) Patent No.: US 9,109,102 B2
(45) Date of Patent: Aug. 18, 2015

(54) RUBBER COMPOSITION FOR USE IN TIRE SIDE WALLS AND PNEUMATIC TIRE USING THE SAME

(75) Inventor: Tomoyuki Wada, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/112,638

(22) PCT Filed: Apr. 18, 2012

(86) PCT No.: PCT/JP2012/002661
§ 371 (c)(1),
(2), (4) Date: Oct. 18, 2013

(87) PCT Pub. No.: WO2012/144200
PCT Pub. Date: Oct. 26, 2012

(65) Prior Publication Data
US 2014/0031482 A1    Jan. 30, 2014

(30) Foreign Application Priority Data
Apr. 19, 2011    (JP) .................. 2011-092860

(51) Int. Cl.
| | |
|---|---|
| *C08L 9/00* | (2006.01) |
| *C08L 7/00* | (2006.01) |
| *B60C 1/00* | (2006.01) |
| *C08L 21/00* | (2006.01) |

(52) U.S. Cl.
CPC .............. *C08L 7/00* (2013.01); *B60C 1/0025* (2013.04); *C08L 9/00* (2013.01); *C08L 21/00* (2013.01)

(58) Field of Classification Search
CPC ........... C08L 23/20; C08L 9/00; C08L 21/00; C08L 7/00; B60C 1/0025; B60C 5/00; C08K 3/04
USPC ........................... 524/495; 152/525; 525/232
See application file for complete search history.

(56) References Cited

FOREIGN PATENT DOCUMENTS
| | | |
|---|---|---|
| JP | 2002-265677 | 9/2002 |
| JP | 2006-063287 | 3/2006 |

OTHER PUBLICATIONS

JP 2006-063287 A (2006), machine translation, JPO Advanced Industrial Property Network (AIPN).*
International Search Report dated May 29, 2012, 3 pages, Japan.

* cited by examiner

*Primary Examiner* — Susannah Chung
*Assistant Examiner* — Josephine Chang
(74) *Attorney, Agent, or Firm* — Thorpe North & Western

(57) ABSTRACT

A rubber composition for use in tire side walls contains from 30 to 40 parts by mass of carbon black having a nitrogen specific surface area of from 20 to 35 m$^2$/g and a DBP oil absorption of from 50 to 95 cm$^3$/100 g per 100 parts by mass of a rubber component constituted by from 30 to 70 mass % of a butadiene rubber having a cis-1,4 bond content of at least 97%, a Mooney viscosity (ML1+4) at 100° C. of at least 45, and a ratio (T–cp)/(ML1+4) of the viscosity [cps] of a 5 mass % toluene solution at 25° C. (T–cp) to the Mooney viscosity of at least 2.0, and from 30 to 70 mass % of another diene-based rubber.

16 Claims, 1 Drawing Sheet

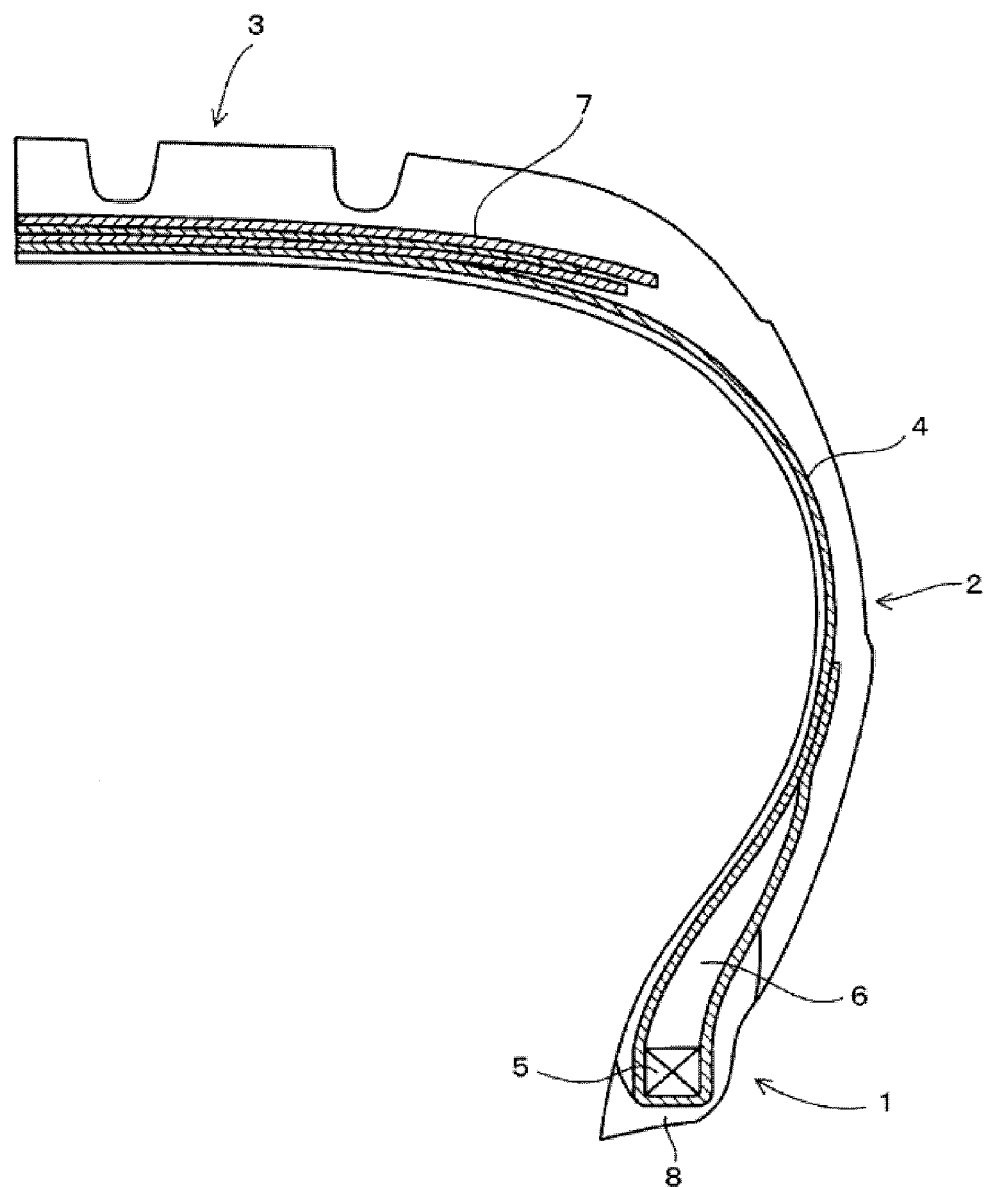

RUBBER COMPOSITION FOR USE IN TIRE SIDE WALLS AND PNEUMATIC TIRE USING THE SAME

TECHNICAL FIELD

The present technology relates to a rubber composition for use in tire side walls and a pneumatic tire using the same; specifically, the present technology relates to a rubber composition for use in tire side walls and a pneumatic tire using the same allowing fuel economy to be improved while suppressing reductions in hardness, and exhibiting superior cut resistance and flexural fatigue resistance.

BACKGROUND

Increased environmental awareness in recent years has led to a demand for increased tire fuel economy. There is also a strong demand in the industry for rubber composition for use in tire side walls that yield not only improved breakdown resistance but also improved fuel economy.

An example of a method of reducing the amount of heat generated by a rubber composition for use in tire side walls is to reduce the amount of filler included therein. However, such means leads to reductions in hardness and tire strength. Another method is to use a molecular weight-reduced terminal-modified diene rubber and large amounts of modifiers in order to suppress heat generation, but this method also presents the problem of filler over-dispersion leading to reductions in hardness. Meanwhile, increasing the compounded amount of vulcanizing system and increasing crosslinking density in order to suppress reductions in hardness allows for a balance of hardness and reduced heat generation, but degrades flexural fatigue resistance.

Japanese Unexamined Patent Application Publication No. 2006-063287 discloses a technique of adding carbon black having a specified specific surface area to a diene rubber component containing a specified butadiene rubber. However, the technique disclosed in Japanese Unexamined Patent Application Publication No. 2006-063287 does not satisfactorily demonstrate high levels of hardness reduction suppression, fuel economy, cut resistance, and flexural fatigue resistance.

SUMMARY

As the result of diligent research, the inventors discovered that adding a specified amount of carbon black having a specified nitrogen specific surface area and DBP oil absorption to a butadiene rubber having specified properties allows the problem described above to be solved, thereby arriving at the present technology.

The present technology provides a rubber composition for use in tire side walls and a pneumatic tire using the same allowing fuel economy to be improved while suppressing reductions in hardness, and exhibiting superior cut resistance and flexural fatigue resistance.

Specifically, the present technology is as follows.

1. A rubber composition for use in tire side walls comprising from 30 to 40 parts by mass of carbon black having a nitrogen specific surface area of from 20 to 35 $m^2/g$ and a DBP oil absorption of from 50 to 95 $cm^3/100$ g per 100 parts by mass of a rubber component comprising from 30 to 70 mass % butadiene rubber having a cis-1,4 bond content of at least 97%, a Mooney viscosity (ML1-4) at 100° C. of at least 45, and a ratio (T-cp)/(ML1-4) of the viscosity [cps] of a 5 mass % toluene solution at 25° C. (T-cp) to the Mooney viscosity of at least 2.0, and from 30 to 70 mass % of another diene-based rubber.

2. The rubber composition for use in tire side walls according to 1, wherein a proportion of carbon to the butadiene rubber in the rubber composition is from 40% to 90%.

3. The rubber composition for use in tire side walls according to 1, wherein the cis-1,4 bond content is at least 98%.

4. The rubber composition for use in tire side walls according to 1, wherein the Mooney viscosity (ML1-4) is from 45 to 70.

5. The rubber composition for use in tire side walls according to 1, wherein the (T-cp)/(ML1-4) is at least 2.0 and less than 3.3.

6. The rubber composition for use in tire side walls according to 5, wherein the (T-cp)/(ML1-4) is at least 2.2 and less than 2.5.

7. The rubber composition for use in tire side walls according to 5, wherein the (T-cp)/(ML1-4) is at least 2.3 and less than 2.5.

8. The rubber composition for use in tire side walls according to any one of 1 to 7, wherein the rubber component is constituted by from 30 to 40 mass % butadiene rubber and from 60 to 70 mass % of another diene-based rubber.

9. The rubber composition for use in tire side walls according to any one of 1 to 8, wherein from 32 to 38 parts by mass of the carbon black included per 100 parts by mass of the rubber component.

10. A pneumatic tire in which the rubber composition for use in tire side walls according to any one of 1 to 9 is used for the side walls thereof.

In accordance with the present technology, a specified amount of carbon black having a specified nitrogen specific surface area and DBP oil absorption is added to a butadiene rubber having specified properties, allowing for the provision of rubber composition for use in tire side walls and a pneumatic tire using the same allowing fuel economy to be improved while suppressing reductions in hardness, and exhibiting superior cut resistance and flexural fatigue resistance.

BRIEF DESCRIPTION OF THE DRAWING

FIG. 1 is a partial cross-sectional view of an example of a pneumatic tire.

DETAILED DESCRIPTION

The present technology will be described in further detail below.

FIG. 1 is a partial cross-sectional view of an example of a pneumatic tire for a passenger vehicle.

In FIG. 1, the pneumatic tire is shown being formed from a pair of right and left bead portions 1, a pair of right and left side walls 2, and a tread 3 extending between both side walls 2. A carcass layer 4 embedded with fiber cords is mounted between the bead portions 1,1. An end of the carcass layer 4 is folded over and up from an inner side of the tire to an outer side of the tire around a bead core 5 and a bead filler 6. In the tread 3, a belt layer 7 is provided along the periphery of the tire 1 on an outer side of the carcass layer 4. Additionally, rim cushions 8 are provided at parts of the bead portions 1 that are in contact with a rim.

The rubber composition for use in tire side walls of the present technology described hereafter is especially useful when used for the side walls 2.

Butadiene Rubber

The butadiene rubber (BR) used in the present technology ("the specified BR") must have a cis-1,4 bond content of at least 97%, a Mooney viscosity (ML1-4) at 100° C. of at least 45, and a ratio (T-cp)/(ML1-4) of the viscosity [cps] of a 5 mass % toluene solution at 25° C. (T-cp) to the Mooney viscosity of at least 2.0. Failure to demonstrate any of the properties described above will inhibit the effects of the present technology.

The cis-1,4 bond content is as measured using a nuclear magnetic resonance (NMR) instrument, and is preferably at least 98%.

The Mooney viscosity is as measured using an L-shaped rotor according to JIS 6300-1. The Mooney viscosity must be at least 45, which will allow for a balance between hardness and fuel economy. The Mooney viscosity is more preferably at least 50. There is no particular limitation upon the maximum Mooney viscosity, but a Mooney viscosity of at most 70 is preferable.

The ratio (T-cp)/(ML1-4) serves as an indicator of the degree of branching of the BR polymer chain, and the larger this value is, the lower the degree of branching is; i.e., the higher linearity is. A value of less than 2.0 for this ratio prevents improvements in any of suppressing reductions in hardness, fuel economy, cut resistance, and flexural fatigue resistance. From considerations of the effects of the present technology, the value of (T-cp)/(ML1-4) is preferably at least 2.0 and less than 3.3, more preferably at least 2.2 and less than 2.5, and especially preferably at least 2.3 and less than 2.5.

The toluene solution viscosity (T-cp) referred to in the ratio is obtained by dissolving a rubber specimen in toluene to obtain a 5 mass % solution, followed by measuring the viscosity of the solution at 25° C. using a Cannon-Fenske kinematic viscometer.

Other Diene Rubber

Examples of the other diene-based rubber used in the present technology include natural rubber (NR), isoprene rubber (IR), butadiene rubbers other than the specified BR, styrene-butadiene copolymer rubber (SBR), acrylonitrile-butadiene copolymer rubber (NBR), and other types of diene-based rubber. These may be used singly or in combinations of two or more. There is no particular limitation upon the molecular weight and microstructure of the rubber component, which may be terminally modified using an amine, amide, silyl, alkoxysilyl, carboxyl, or hydroxyl group or the like, or may be epoxidized.

In the present technology, there must be from 30 to 70 mass % of the specified BR and from 30 to 70 mass % of the other diene-based rubber per total 100 parts by mass of the specified BR and the other diene-based rubber. Flexural fatigue resistance will be degraded if there is less than 30 mass % specified BR. Conversely, hardness and cut resistance will be degraded if there is more than 70 mass % specified BR.

Preferred proportions of the specified BR and the other diene-based rubber are from 30 to 40 mass % specified BR and from 60 to 70 mass % other diene-based rubber.

Carbon Black

In the present technology, carbon black having a nitrogen specific surface area ($N_2SA$) of from 20 to 35 $m^2/g$ and a DBP oil absorption of from 50 to 95 $cm^3/100$ g ("the specified CB") is used.

An $N_2SA$ of less than 20 $m^2/g$ will degrade reinforcing strength and reduce hardness.

An $N_2SA$ of greater than 35 $m^2/g$ will lead to more severe heat generation.

A DBP oil absorption of less than 50 $cm^3/100$ g will degrade reinforcing strength and reduce hardness.

A DBP oil absorption of greater than 95 $cm^3/100$ g will lead to more severe heat generation.

From considerations of the effects of the present technology, the proportion of carbon to the specified BR is preferably from 40% to 90%.

The proportion of carbon is determined by measuring the degree to which the specified CB is present within the specified BR of the rubber composition following vulcanization. Specifically, the proportion of carbon is determined by vulcanizing the rubber composition, preparing a measurement strip, observing the cross section of the measurement strip using an electron microscope, and calculating the area (%) of the specified CB within the specified BR against the total area of the dispersed specified CB. An islands-in-the-sea structure will generally be observed in the electron microscope image of the rubber composition, with the specified BR forming the islands. The proportion of carbon can be determined by calculating the area of the specified CB in the overall islands-in-the-sea structure and the area of the specified CB in the islands using image analysis software.

In order to achieve a proportion of carbon of from 40% to 90%, the order in which the diene-based rubber, carbon black, oil, and other ingredients are added during preparation of the rubber composition and the kneading time may be adjusted as appropriate.

A more preferable proportion of carbon is from 50% to 70%.

The nitrogen specific surface area is as measured according to JIS K6217, and the DBP oil absorption is as measured according to JIS K6217.

Filler

Apart from the carbon black, various fillers can be added to the rubber composition for use in tire side walls of the present technology. There is no particular limitation upon the filler used, and fillers may be selected, as appropriate, according to application; examples include silica, clay, talc, calcium carbonate, and other inorganic fillers.

Proportions of Ingredients in the Rubber Composition for Use in Tire Side Walls

The rubber composition for use in tire side walls according to the present technology is characterized in that from 30 to 40 parts by mass of the specified CB is added per 100 parts by mass of the rubber component.

A proportion of specified CB of less than 30 parts by mass will inhibit improvements in hardness, cut resistance, and flexural fatigue resistance. Conversely, a proportion of specified CB of greater than 40 parts by mass will lead to more severe heat generation.

A more preferable proportion is from 32 to 38 parts by mass of the specified CB to 100 parts by mass of the rubber component.

In addition to the aforementioned components, the rubber composition for use in tire side walls according to the present technology can also contain various types of additives commonly added to rubber compositions, such as vulcanizing and crosslinking agents, vulcanizing and crosslinking accelerators, various types of oils, antiaging agents, plasticizers, and the like. Such additives may be kneaded in to obtain a composition according to a typical method, and used to effect vulcanization or crosslinking These additives may be added in amounts typical within the prior art to the extent that the object of the present technology is not impeded.

The rubber composition for use in tire side walls according to the present technology can be also used to manufacture a pneumatic tire according to a conventional method for manufacturing pneumatic tires.

EXAMPLES

The present technology will be described in further detail with reference to working examples and comparative examples; however, the present technology is not limited by these examples.

Working Examples 1 to 6; Comparative Examples 1 to 11

Preparation of Samples

The components other than the vulcanization accelerator and the sulfur were kneaded for 5 minutes in a 1.5 L sealed Banbury mixer in the amounts (in parts by mass) shown in Table 1, after which a master batch was released at 150° C. and cooled in room temperature. The vulcanization accelerator and sulfur were then added and the master batch was kneaded for 2 minutes using rollers to obtain a rubber composition for use in tire side walls. Next, the rubber composition thus obtained was press-vulcanized in a predetermined mold at 160° C. for 20 minutes to fabricate a vulcanized rubber test strip. The physical properties of the obtained rubber composition and vulcanized rubber test strip were measured according to the following testing methods.

Hardness: Shore A hardness at 20° C. was measured according to JIS K6253. The results are shown as indexes against a value of 100 for Comparative Example 1. Larger index values indicate higher hardness.

Heat generation: tan δ (60° C.) was measured using a viscoelastic spectrometer manufactured by Toyo Seiki Seisaku-sho, Ltd. at an initial warping of 10%, an amplitude of ±2%, and a frequency of 20 Hz, and this value was used to rate heat generation. The results are shown as indexes against a value of 100 for Comparative Example 1. Smaller index values indicate reduced heat build-up.

Cut resistance: abrasion level was measured using a pico abrasion test according to JIS K6264. The results are shown as indexes against a value of 100 for Comparative Example 1. Higher index values indicate more satisfactory cut resistance.

Flexural fatigue resistance: flexing was repeatedly performed according to JIS K6260, and the number of repetitions at which breakage occurred was measured. The results are shown as indexes against a value of 100 for Comparative Example 1. Larger index values indicate more superior flexural fatigue resistance.

The results are also shown in Table 1.

TABLE 1

| | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| NR *1 | 50 | 50 | 50 | 50 | 50 | 50 |
| BR-1 *2 | — | 50 | — | — | — | 50 |
| BR-2 *3 | — | — | 50 | — | — | — |
| BR-3 *4 | — | — | — | 50 | 50 | — |
| BR-4 *5 | 50 | — | — | — | — | — |
| Carbon black-1 *6 | — | — | — | — | — | — |
| Carbon black-2 *7 | 40 | 40 | 40 | 40 | — | — |
| Carbon black-3 *8 | — | — | — | — | 40 | 40 |
| Carbon black-4 *9 | — | — | — | — | — | — |
| Zinc oxide *10 | 3 | 3 | 3 | 3 | 3 | 3 |
| Stearic acid *11 | 2 | 2 | 2 | 2 | 2 | 2 |
| Oil *12 | 10 | 10 | 10 | 10 | 10 | 10 |
| Sulfur *13 | 3 | 3 | 3 | 3 | 3 | 3 |
| Vulcanization accelerator *14 | 2 | 2 | 2 | 2 | 2 | 2 |
| Carbon proportion | 70% | 70% | 70% | 70% | 70% | 70% |
| Test results | | | | | | |
| Hardness | 100 | 96 | 96 | 98 | 95 | 93 |
| tan δ (60° C.) | 100 | 108 | 96 | 94 | 93 | 103 |
| Cut resistance | 100 | 96 | 98 | 98 | 95 | 93 |
| Flexural fatigue resistance | 100 | 96 | 98 | 98 | 98 | 100 |

| | Comp. Ex. 7 | Comp. Ex. 8 | Comp. Ex. 9 | Comp. Ex. 10 | Comp. Ex. 11 | Comp. Ex. 12 |
|---|---|---|---|---|---|---|
| NR *1 | 50 | 50 | 50 | 20 | 80 | 50 |
| BR-1 *2 | — | — | — | — | — | — |
| BR-2 *3 | — | — | — | — | — | — |
| BR-3 *4 | — | — | — | — | — | — |
| BR-4 *5 | 50 | 50 | 50 | 80 | 20 | 50 |
| Carbon black-1 *6 | 40 | — | — | — | — | — |
| Carbon black-2 *7 | — | — | — | — | — | — |
| Carbon black-3 *8 | — | 25 | 45 | 40 | 40 | — |
| Carbon black-4 *9 | — | — | — | — | — | 40 |
| Zinc oxide *10 | 3 | 3 | 3 | 3 | 3 | 3 |
| Stearic acid *11 | 2 | 2 | 2 | 2 | 2 | 2 |
| Oil *12 | 10 | 10 | 10 | 10 | 10 | 10 |
| Sulfur *13 | 3 | 3 | 3 | 3 | 3 | 3 |
| Vulcanization accelerator *14 | 2 | 2 | 2 | 2 | 2 | 2 |
| Carbon proportion | 70% | 70% | 70% | 70% | 70% | 70% |
| Test results | | | | | | |
| Hardness | 106 | 88 | 103 | 97 | 101 | 110 |
| tan δ (60° C.) | 115 | 92 | 103 | 95 | 98 | 107 |
| Cut resistance | 105 | 89 | 104 | 90 | 106 | 103 |
| Flexural fatigue resistance | 105 | 92 | 103 | 103 | 93 | 104 |

| | W.E. 1 | W.E. 2 | W.E. 3 | W.E. 4 | W.E. 5 | W.E. 6 |
|---|---|---|---|---|---|---|
| NR *1 | 50 | 50 | 50 | 30 | 65 | 70 |
| BR-1 *2 | — | — | — | — | — | — |
| BR-2 *3 | — | — | — | — | — | — |
| BR-3 *4 | — | — | — | — | — | — |
| BR-4 *5 | 50 | 50 | 50 | 70 | 35 | 30 |
| Carbon black-1 *6 | — | — | — | — | — | — |
| Carbon black-2 *7 | — | — | — | — | — | — |
| Carbon black-3 *8 | 40 | 35 | 30 | 40 | 40 | 40 |
| Carbon black-4 *9 | — | — | — | — | — | — |
| Zinc oxide *10 | 3 | 3 | 3 | 3 | 3 | 3 |
| Stearic acid *11 | 2 | 2 | 2 | 2 | 2 | 2 |

TABLE 1-continued

| *11 | | | | | | |
|---|---|---|---|---|---|---|
| Oil *12 | 10 | 10 | 10 | 10 | 10 | 10 |
| Sulfur *13 | 3 | 3 | 3 | 3 | 3 | 3 |
| Vulcanization accelerator *14 | 2 | 2 | 2 | 2 | 2 | 2 |
| Carbon proportion | 70% | 70% | 70% | 70% | 70% | 70% |
| Test results | | | | | | |
| Hardness | 102 | 101 | 100 | 100 | 101 | 102 |
| tan δ (60° C.) | 95 | 91 | 88 | 92 | 96 | 97 |
| Cut resistance | 103 | 101 | 100 | 101 | 105 | 108 |
| Flexural fatigue resistance | 104 | 102 | 101 | 107 | 102 | 101 |

In Table 1, "Comp. Ex." is an abbreviation for "Comparative Example"; and "W.E." is an abbreviation for "Working Example."
*1: NR (RSS#1)
*2: BR-1 (Nipol BR-1220, Zeon Corporation; cis-1,4 bond content = 98%; Mooney viscosity (ML1 + 4) at 100° C. = 43; (T − cp)/(ML1 + 4) = 1.4)
*3: BR-2 (UBEPOL 230, Ube Industries, Ltd.; cis-1,4 bond content = 98%; Mooney viscosity (ML1 + 4) at 100° C. = 38; (T − cp)/(ML1 + 4) = 3.1)
*4: BR-3 (UBEPOL 150L, Ube Industries, Ltd.; cis-1,4 bond content = 98%; Mooney viscosity (ML1 + 4) at 100° C. = 43; (T − cp)/(ML1 + 4) = 2.8)
*5: BR-4 (BR360L, Ube Industries, Ltd.; cis-1,4 bond content = 98%; Mooney viscosity (ML1 + 4) at 100° C. = 51; (T − cp)/(ML1 + 4) = 2.4)
*6: Carbon black-1 (Seast ® N3, Tokai Carbon Co., Ltd; $N_2SA$ = 79 $m^2$/g; DBP oil absorption = 101 $cm^3$/100 g)
*7: Carbon black-2 (Seast ® SO, Tokai Carbon Co., Ltd; $N_2SA$ = 42 $m^2$/g; DBP oil absorption = 115 $cm^3$/100 g)
*8: Carbon black-3 (Seast ® V, Tokai Carbon Co., Ltd; $N_2SA$ = 27 $m^2$/g; DBP oil absorption = 87 $cm^3$/100 g)
*9: Carbon black-4 (trade designation "Shoblack ® N326", Cabot Japan K.K.; $N_2SA$ = 84 $m^2$/g; DBP oil absorption = 76 $cm^3$/100 g)
*10: Zinc oxide (Zinc Oxide #3, Seido Chemical Industry Co., Ltd.)
*11: Stearic acid (stearic acid beads, NOF Corporation)
*12: Oil (Extract No. 4S, Showa Shell Sekiyu K.K.)
*13: Sulfur ("Golden Flower" oil-treated sulfur powder, Tsurumi Chemical)
*14: Vulcanization accelerator (Noccelar CZ-G, Ouchi Shinko Chemical Industrial Co., Ltd.)

As is clear from Table 1 above, the rubber composition for use in tire side walls prepared according to Working Examples 1 to 6 involved particular amounts of carbon black having a specified nitrogen specific surface area and DBP oil absorption added to butadiene rubbers having specified properties, and yielded improvements in fuel economy while suppressing reductions in hardness and exhibited superior cut resistance and flexural fatigue resistance compared to the rubber composition of Comparative Example 1.

In contrast, Comparative Example 2 used a BR having a Mooney viscosity (ML1−4) at 100° C. and (T−cp)/(ML1−4) less than the minimums defined for the present technology, and a carbon black $N_2SA$ and DBP oil absorption exceeding the maximums defined for the present technology, and therefore exhibited degradation in all of hardness, severity of heat generation, cut resistance, and flexural fatigue resistance.

Comparative Example 3 used a BR having a Mooney viscosity (ML1−4) at 100° C. less than the minimum defined for the present technology, and a carbon black $N_2SA$ and DBP oil absorption exceeding the maximums defined for the present technology, and therefore exhibited degradation in all of hardness, cut resistance, and flexural fatigue resistance.

Comparative Example 4 used a BR having a Mooney viscosity (ML1−4) at 100° C. less than the minimum defined for the present technology, and a carbon black $N_2SA$ and DBP oil absorption exceeding the maximums defined for the present technology, and therefore exhibited degradation in all of hardness, cut resistance, and flexural fatigue resistance.

Comparative Example 5 used a carbon black exhibiting values within the ranges defined for the present technology, but the Mooney viscosity (ML1−4) at 100° C. of the BR was less than the minimum defined for the present technology, and degradations in hardness, cut resistance, and flexural fatigue resistance were exhibited.

Comparative Example 6 used a carbon black exhibiting values within the defined ranges, but the Mooney viscosity (ML1−4) at 100° C. and (T−cp)/(ML1−4) of the BR were less than the minimums defined for the present technology, and degradations in hardness, severity of heat generation, and cut resistance were exhibited.

Comparative Example 7 used the specified BR, but the $N_2SA$ and DBP oil absorption of the carbon black exceeded the maximums defined for the present technology, and a degradation in severity of heat generation was exhibited.

Comparative Example 8 used the specified BR, but the amount of carbon black included was less than the minimum defined for the present technology, and degradations in hardness, cut resistance, and flexural fatigue resistance were exhibited.

Comparative Example 9 used the specified BR, but the amount of carbon black included exceeded the maximum defined for the present technology, and a degradation in severity of heat generation was exhibited.

Comparative Example 10 included an amount of specified BR exceeding the maximum defined for the present technology, and thus exhibited degradations in hardness and cut resistance.

Comparative Example 11 included an amount of specified BR less than the minimum defined for the present technology, and thus exhibited a degradation in flexural fatigue resistance.

Comparative Example 12 used the specified BR, but the $N_2SA$ of the carbon black was not within the range defined for the present technology, and a degradation in severity of heat generation was exhibited.

What is claimed is:

1. A tire side wall rubber composition comprising:
   from 30 to 40 parts by mass of carbon black having a nitrogen specific surface area of from 20 to 35 $m^2$/g and a DBP oil absorption of from 50 to 95 $cm^3$/100 g per 100 parts by mass of a rubber component comprising from 30 to 70 mass % butadiene rubber having a cis-1,4 bond content of at least 97%, a Mooney viscosity (ML1+4) at 100° C. of at least 45, and a ratio (T−cp)/(ML1+4) of the viscosity [cps] of a 5 mass % toluene solution at 25° C. (T−cp) to the Mooney viscosity of at least 2.2 and not greater than 2.4, and
   from 30 to 70 mass % of another diene-based rubber.

2. The tire side wall rubber composition according to claim 1, wherein the rubber component is constituted by from 30 to 40 mass % butadiene rubber and from 60 to 70 mass % of another diene-based rubber.

3. The tire side wall rubber composition according to claim 1, wherein from 32 to 38 parts by mass of the carbon black included per 100 parts by mass of the rubber component.

4. The tire side wall rubber composition according to claim 1, wherein a proportion of the carbon black to the butadiene rubber in the rubber composition is from 40% to 90%.

5. The tire side wall rubber composition according to claim 4, wherein the rubber component is constituted by from 30 to 40 mass % butadiene rubber and from 60 to 70 mass % of another diene-based rubber.

6. The tire side wall rubber composition according to claim 4, wherein from 32 to 38 parts by mass of the carbon black included per 100 parts by mass of the rubber component.

7. The tire side wall rubber composition according to claim 1, wherein the cis-1,4 bond content is at least 98%.

8. The tire side wall rubber composition according to claim 7, wherein the rubber component is constituted by from 30 to 40 mass % butadiene rubber and from 60 to 70 mass % of another diene-based rubber.

9. The tire side wall rubber composition according to claim 7, wherein from 32 to 38 parts by mass of the carbon black included per 100 parts by mass of the rubber component.

10. The tire side wall rubber composition according to claim 1, wherein the Mooney viscosity (ML1+4) is from 45 to 70.

11. The tire side wall rubber composition according to claim 10, wherein the rubber component is constituted by from 30 to 40 mass % butadiene rubber and from 60 to 70 mass % of another diene-based rubber.

12. The tire side wall rubber composition according to claim 10, wherein from 32 to 38 parts by mass of the carbon black included per 100 parts by mass of the rubber component.

13. The tire side wall rubber composition according to claim 1, wherein the (T–cp)/(ML1+4) is at least 2.3 and not greater than 2.4.

14. The tire side wall rubber composition according to claim 13, wherein the rubber component is constituted by from 30 to 40 mass % butadiene rubber and from 60 to 70 mass % of another diene-based rubber.

15. The tire side wall rubber composition according to claim 14, wherein from 32 to 38 parts by mass of the carbon black is included per 100 parts by mass of the rubber component.

16. A pneumatic tire having side walls comprising the tire side wall rubber composition according to claim 15.

* * * * *